United States Patent
Omielan et al.

(10) Patent No.: US 8,291,714 B2
(45) Date of Patent: Oct. 23, 2012

(54) RADIAL STAGING METHOD AND CONFIGURATION OF A LIQUID INJECTION SYSTEM FOR POWER PLANTS

(75) Inventors: Walter Kasimierz Omielan, Dorval (CA); Gabriel Taraboulsi, Dorval (CA); Chris Pin Harry, Dorval (CA)

(73) Assignee: Rolls-Royce Power Endgineering PLC (GB)

(*) Notice: Subject to any disclaimer, the term of this patent is extended or adjusted under 35 U.S.C. 154(b) by 979 days.

(21) Appl. No.: 12/329,124

(22) Filed: Dec. 5, 2008

(65) Prior Publication Data
US 2009/0145100 A1 Jun. 11, 2009

Related U.S. Application Data

(60) Provisional application No. 60/992,962, filed on Dec. 6, 2007.

(51) Int. Cl.
*F02C 3/30* (2006.01)
(52) U.S. Cl. .......................... 60/775; 60/39.53
(58) Field of Classification Search .................. 60/39.53, 60/728, 775; 415/116, 191; 239/548, 556, 239/557, 565
See application file for complete search history.

(56) References Cited

U.S. PATENT DOCUMENTS

| | | | |
|---|---|---|---|
| 4,418,527 A | 12/1983 | Schlom et al. | |
| 4,773,846 A | 9/1988 | Munk | |
| 5,273,395 A * | 12/1993 | McDermott | 415/121.3 |
| 5,867,977 A | 2/1999 | Zachary et al. | |
| 5,930,990 A | 8/1999 | Zachary et al. | |
| 6,216,443 B1 | 4/2001 | Utamura | |
| 6,250,064 B1 | 6/2001 | Tomlinson et al. | |
| 6,378,284 B1 | 4/2002 | Utamura | |
| 6,802,178 B2 | 10/2004 | Sprouse | |
| 6,820,430 B1 | 11/2004 | Tassone et al. | |
| 7,854,125 B2 * | 12/2010 | Eadon et al. | 60/775 |

(Continued)

FOREIGN PATENT DOCUMENTS

DE 843043 7/1952
(Continued)

OTHER PUBLICATIONS

Extended European Search Report for European Patent Application No. 08105943 dated Apr. 7, 2010.

(Continued)

*Primary Examiner* — Phutthiwat Wongwian
(74) *Attorney, Agent, or Firm* — McCormick, Paulding & Huber LLP

(57) ABSTRACT

A turbine power plant employs a radial staging of a liquid injection system to provide a uniform fluid distribution, for use in wet compression. The liquid injection system includes a hub to be coupled to an air intake case of a turbine power plant. An annular ring assembly is spaced radially outwardly from the hub. Spray bars are spoked about the hub and the annular ring. The spray bars each include a body portion having an inner end coupled to the hub and an outer end coupled to the ring assembly. The spray bars each have at least two nozzle assemblies along the body portion. The spray bars each define at least two liquid supply manifolds each having an inlet at the annular ring assembly and an outlet at an associated nozzle assembly. The liquid supply manifolds each supply liquid to one or more associated nozzle assemblies.

9 Claims, 5 Drawing Sheets

U.S. PATENT DOCUMENTS

2009/0038313 A1 * 2/2009 Ball et al. .................. 60/775

FOREIGN PATENT DOCUMENTS

| DE | 10254721 | 6/2004 |
|---|---|---|
| DE | 10256193 | 6/2004 |
| DE | 10354864 | 7/2005 |
| EP | 1905984 | 4/2008 |

OTHER PUBLICATIONS

"Gas Turbine Performance Improvement Direct Mixing Evaporative Cooling System American Atlas Cogeneration Facility Rifle, Colorado," Nolan et al. ASME Paper No. 90-GT-368 (1990).

* cited by examiner

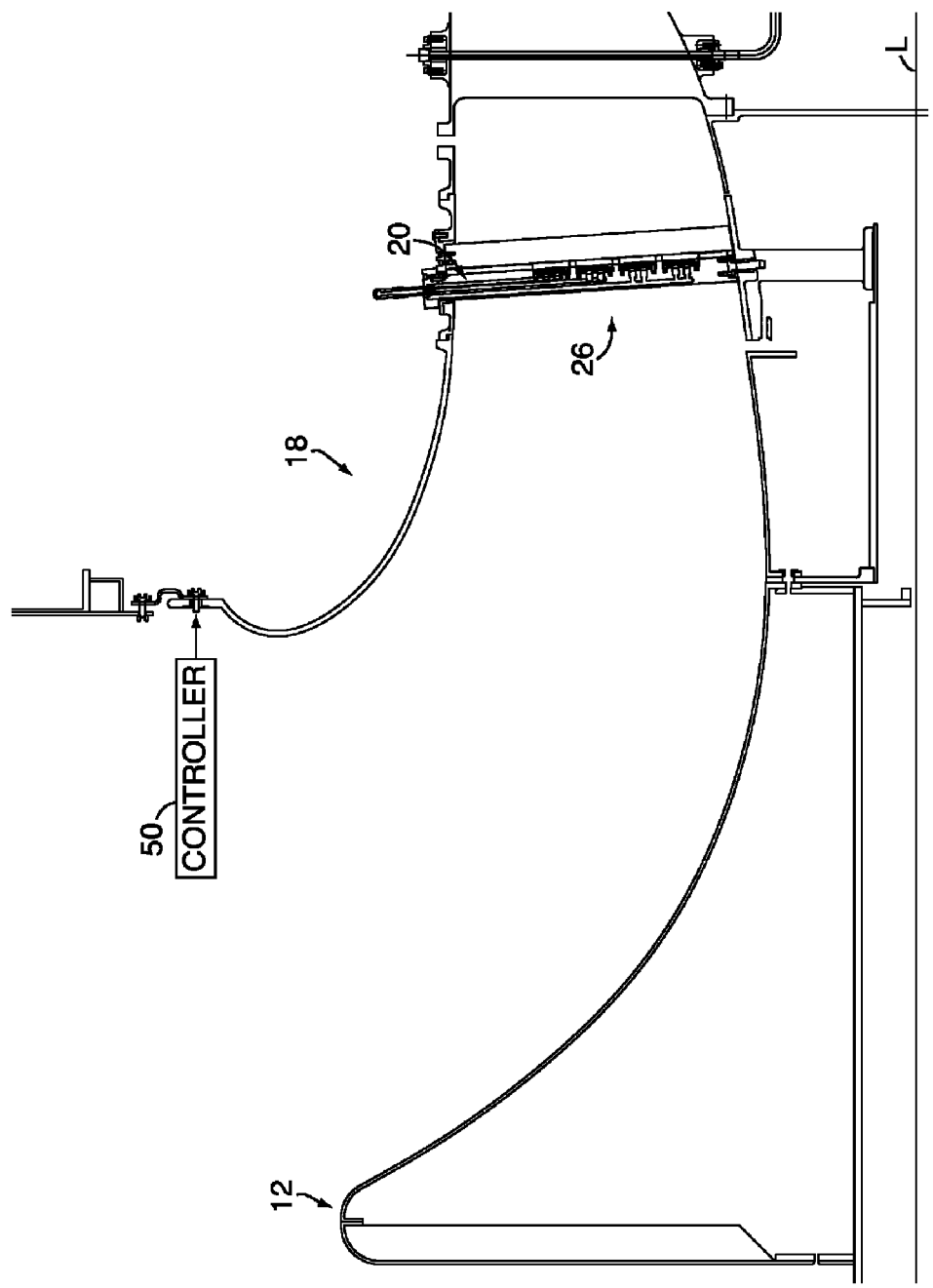

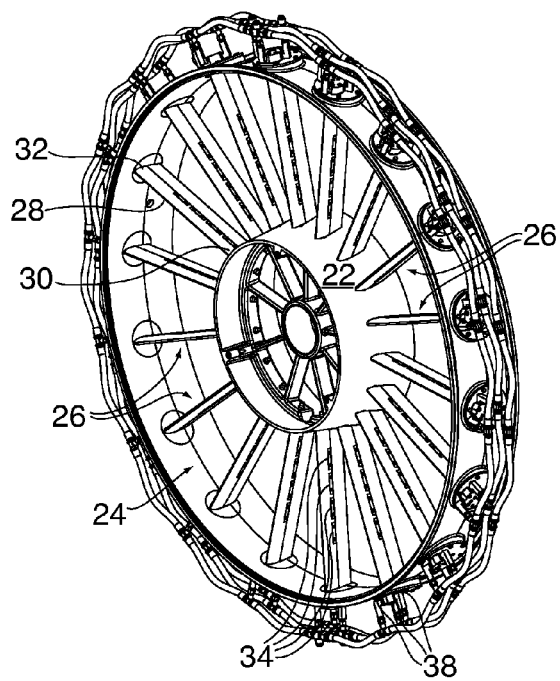
FIG. 3A
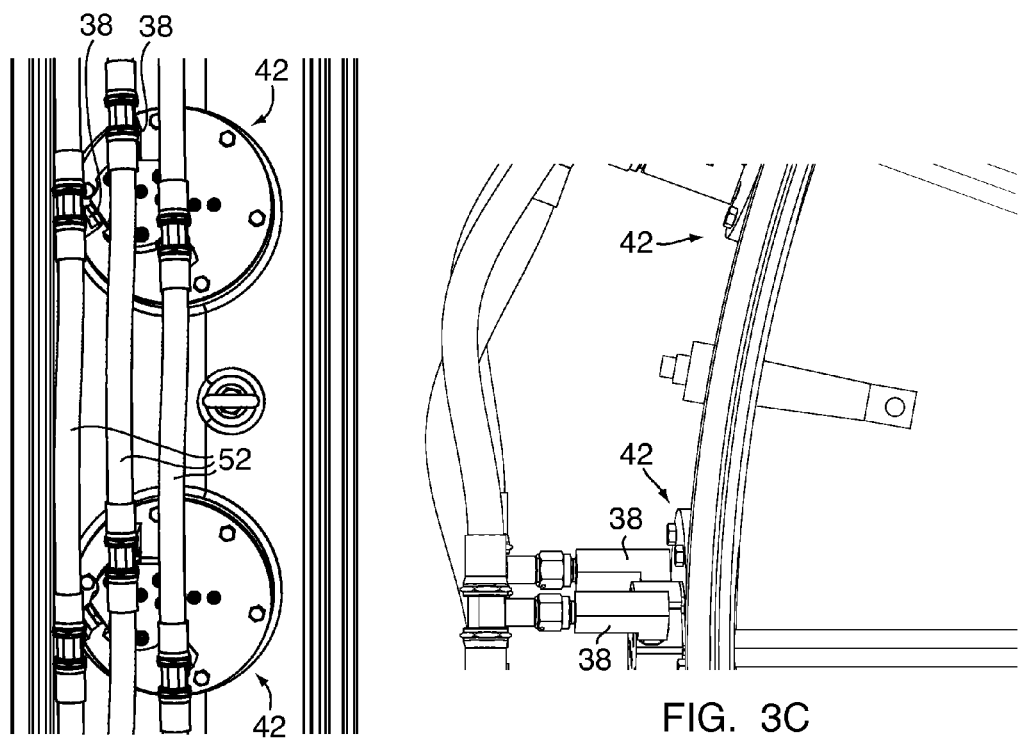
FIG. 3B
FIG. 3C

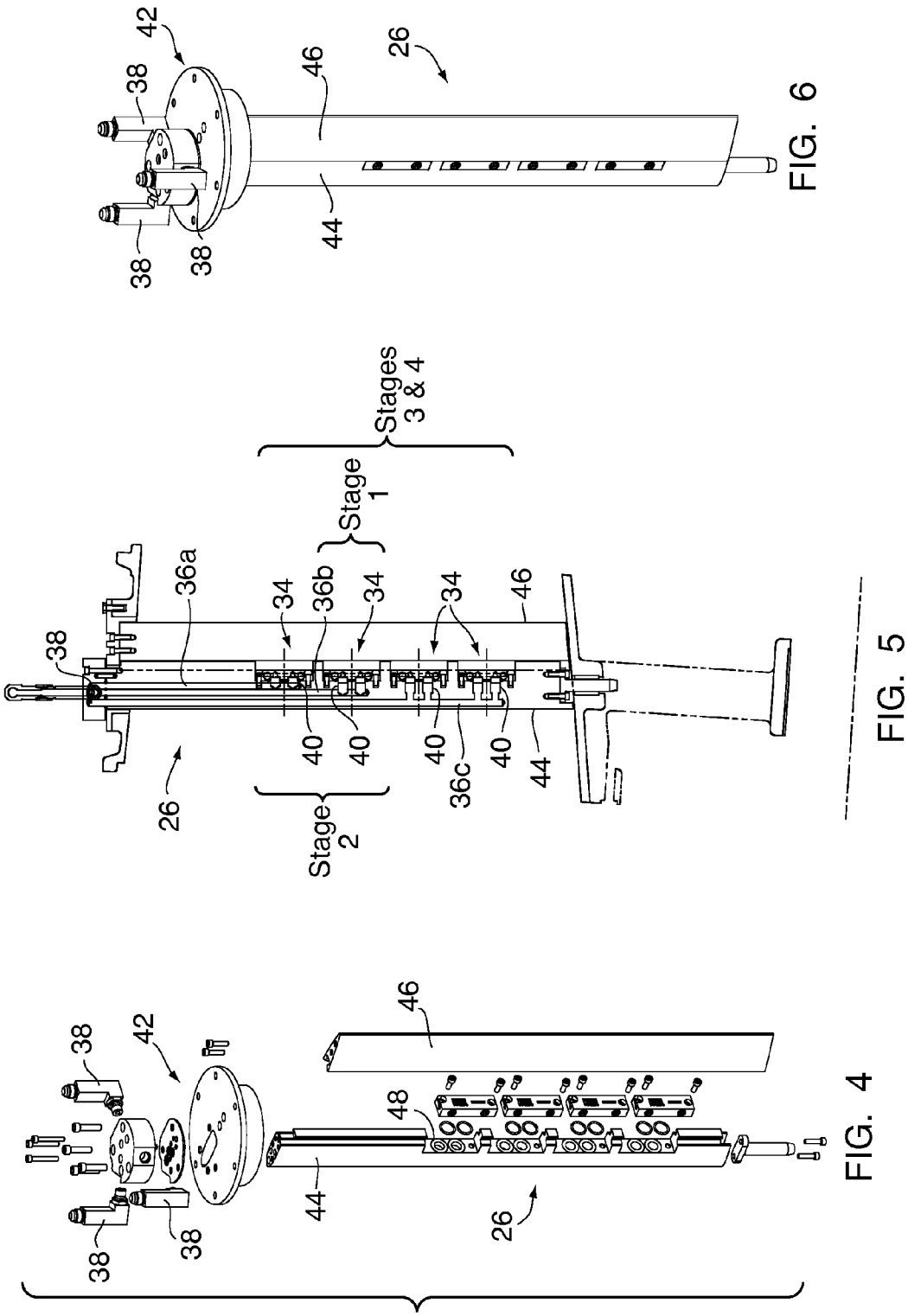

RADIAL STAGING METHOD AND CONFIGURATION OF A LIQUID INJECTION SYSTEM FOR POWER PLANTS

CROSS-REFERENCE TO RELATED APPLICATION

This application claims the benefit of U.S. Provisional Application Ser. No. 60/992,962, filed on Dec. 6, 2007, entitled "Radial Staging of a Liquid Injection System for Power Plants", the disclosure of which is hereby incorporated by reference in its entirety.

FIELD OF THE INVENTION

The present invention relates generally to the radial staging method and configuration of a liquid injection system for power plants, and more particularly to the radial staging of a liquid injection system configured for reducing the possibility of damage to blades integral to a turbine power plant.

BACKGROUND OF THE INVENTION

Turbine power plants, such as gas turbines, are used in a variety of useful applications. Aviation, shipping, power generation, and chemical processing have all benefited from turbine power plants of various designs.

Turbine power plants (i.e., combustion turbines) typically have a compressor section for compressing inlet air, a combustion section for combining the compressed inlet air with fuel and oxidizing that fuel, and a turbine section where the energy from the hot gas produced by the oxidation of the fuel is converted into work. Usually, natural gas (mostly methane), kerosene, or synthetic gas (such as carbon monoxide) is fed as fuel to the combustion section, but other fuels could be used. The rotor—defined by a rotor shaft, attached turbine section rotor blades, and attached compressor section rotor blades—mechanically powers the compressor section and, in some cases, a compressor used in a chemical process or an electric generator. The exhaust gas from the turbine section can used to achieve thrust; it also can be a source of heat and energy, or, in some cases, it is discarded.

It is known that materials such as water can also be added when the turbine power plant is operating to augment the power output capability of a turbine power plant above the output achievable with normally humidified or ambient air. Such a procedure is known as wet compression. Wet compression enables power augmentation in turbine power plants by reducing the work required for compression of the inlet air. This thermodynamic benefit is realized within the compressor of a gas turbine through "latent heat intercooling" where water (or some other appropriate liquid) added to the air inducted into the compressor cools that air through evaporation as the air with the added water is being compressed. The added water can be conceptualized as an "evaporative liquid heat sink".

The wet compression approach thus saves an incremental amount of work (which would have been needed to compress air not containing the added water) and makes the incremental amount of work available to either drive the load attached to the gas turbine (in the case of a single shaft machine) or to increase the compressor speed to provide more mass flow (which can have value in both single shaft and multiple shaft machines).

Various methods and apparatuses have been employed to facilitate the introduction of fluid (i.e., water) to the working fluid of turbine power plants so as to realize the benefits of wet compression. One such known method involves the circumferential introduction or staging of water to the turbine power plant. While effective to a certain degree, the circumferential staging of water in turbine power plants often results in the introduction of different forcing functions into the components of the turbine power plant (depending on how many spray arms are being employed) which could lead to damage of these components such as the blades of the turbine power plant.

With the forgoing problems and concerns in mind, it is the general object of the present invention to provide a radial staging of a liquid injection system configured for reducing the possibility of damage to blades and other components that are integral to a turbine power plant.

SUMMARY OF THE INVENTION

In one aspect of the present invention, a liquid injection system for a turbine power plant includes a hub configured to be coupled to an air intake case of a turbine power plant. An annular ring assembly is spaced radially outwardly from the hub. A plurality of spray bars is spoked between and circumferentially spaced about the hub and the annular ring. The spray bars each include an elongated body portion having an inner end coupled to the hub and an outer end coupled to the annular ring assembly. The spray bars each have at least two nozzle assemblies spaced from one another along the body portion. The spray bars each define at least two liquid supply manifolds each having an inlet at the annular ring assembly and an outlet at an associated nozzle assembly. The liquid supply manifolds each are configured to supply liquid to an associated at least one of the nozzle assemblies.

In another aspect of the present invention, a method of injecting liquid within a turbine power plant includes providing a hub configured to be coupled to an air intake case of a turbine power plant, an annular ring assembly spaced radially outwardly from the hub, and a plurality of spray bars spoked between and circumferentially spaced about the hub and the annular ring. The spray bars each include an elongated body portion having an inner end coupled to the hub and an outer end coupled to the annular ring assembly. The spray bars each have at least two nozzle assemblies spaced from one another along the body portion, and the spray bars each define at least two liquid supply manifolds each having an inlet at the annular ring assembly and an outlet at an associated nozzle assembly. Liquid is directed during a stage one actuation to each of the spray bars such that through each of the spray bars the liquid flows through a first one of the manifolds to energize a first one of the nozzle assemblies. Liquid is directed during a stage two actuation to each of the spray bars such that through each of the spray bars the liquid further flows through a second one of the manifolds to energize a second one of the nozzle assemblies.

In a further aspect of the present invention, a method of injecting liquid within a turbine power plant includes providing a hub configured to be coupled to an air intake case of a turbine power plant, an annular ring assembly spaced radially outwardly from the hub, and a plurality of spray bars spoked between and circumferentially spaced about the hub and the annular ring. The spray bars each include an elongated body portion having an inner end coupled to the hub and an outer end coupled to the annular ring assembly. The spray bars each have at least two nozzle assemblies spaced from one another along the body portion, and the spray bars each define at least two liquid supply manifolds each having an inlet at the annular ring assembly and an outlet at an associated nozzle assembly. Liquid is selectively directed through the liquid supply manifolds to operate the nozzle assemblies independently or in combination with one another.

BRIEF DESCRIPTION OF THE DRAWINGS

FIG. 2 is an enlarged partial elevational view of the liquid injection system of FIG. 1.

FIG. 3A is a perspective view of the annular ring and spray bars of the liquid injection system.

FIG. 3B is an enlarged end view of a portion of the annular ring.

FIG. 3C is an enlarged side view of a portion of the annular ring.

FIG. 4 is an exploded view of a spray bar.

FIG. 5 is a cross-sectional view of a spray bar.

FIG. 6 is a perspective view of a spray bar.

DETAILED DESCRIPTION OF THE PREFERRED EMBODIMENTS

Figure 1:
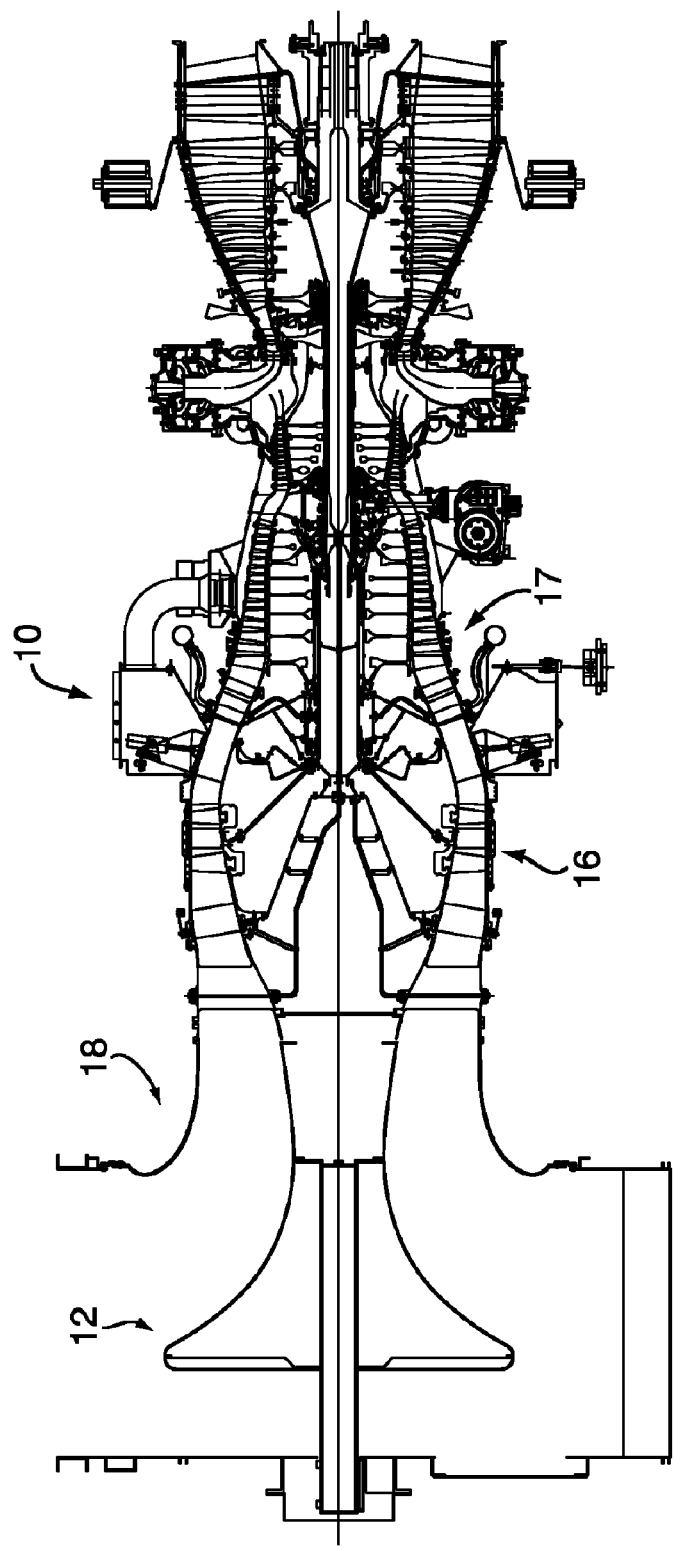
FIG. 1 is a cross-sectional view of a turbine power plant incorporating a liquid injection system according to an embodiment of the present invention.

FIG. 1 illustrates a cross-sectional view of a turbine power plant 10 embodying the present invention. As shown in FIG. 1, an air intake end 12 receives a working fluid (i.e., ambient air) therethrough, which passes serially through a compressor, combustion and turbine fan sections as commonly known in the art.

As also shown in FIG. 1, a liquid injection system 18 in accordance with the present invention is located in an area in front of the turbine inlet case and behind the package intake.

The liquid injection system 18 preferably is oriented closely to compressor sections, 16 and 17. By disposing the liquid injection system 18 closely to the compressor sections 16 and 17, the liquid injection system 18 largely avoids having the water-infused working fluid from impacting a large number of static structures prior to the compressor sections 16 and 17. In this manner, the positioning of the liquid injection system 18 closely to the compressor sections 16 and 17 of the turbine power plant 10 correspondingly reduces the chance of damage to compressors and the like oriented downstream of the liquid injection system.

FIG. 2 illustrates an enlarged elevational or side view of the upper half of the liquid injection system 18. The liquid injection system 18 is disposed in an annular ring 20 which is concentrically aligned with the longitudinal operating axis L of the turbine power plant 10. The general purpose of the liquid injection system 18 is to provide a selective and measured amount of water to the working fluid (i.e., air) which is being drawn through the inlet or air intake end 12.

Indeed, it is another aspect of the present invention that the liquid injection system 18 operates in such a manner that only a single forcing function is produced. That is, the liquid injection system 18 embodying the present invention is capable of producing an approximately uniform annulus of water infusion to the working fluid, concentrically aligned with the operating axis L of the turbine power plant 10, as will be described in more detail later. In this way, the liquid injection system 18 embodying the present invention avoids the localized high pressure areas that are common in known circumferential injection systems.

With reference to FIGS. 3A through 3C, the liquid injection system 18 for a turbine power plant comprises a hub 22 configured to be coupled to an air intake case of a turbine power plant. An annular ring assembly 24 is spaced radially outwardly from the hub 22. A plurality of spray bars 26 are spoked between and circumferentially spaced about the hub 22 and the annular ring assembly 24. The spray bars 26 each include an elongated body portion 28 having an inner end 30 coupled to the hub 22 and an outer end 32 coupled to the annular ring assembly 24. The spray bars 26 each have a plurality of nozzle assemblies 34 spaced from one another along the body portion 28. As shown in FIGS. 2 and 5, the spray bars 26 each define a plurality of liquid supply manifolds 36a, 36b, 36c each having an inlet 38 at the annular ring assembly 24 and an outlet 40 at an associated nozzle assembly 34. The plurality of liquid supply manifolds 36a, 36b, 36c each are configured to supply liquid to an associated at least one of the plurality of nozzle assemblies 34.

Each of the spray bars 26 has an adapter cap 42 nested in the annular ring assembly 24. As best seen in the exploded view of FIG. 4 and the cross-sectional view of FIG. 5, the spray bars 26 are formed to have an interlocking front and rear pairing 44 and 46 respectively. The front and rear parings 44 and 46 are preferably both releasably fixed to the adapter cap 42.

As shown in FIGS. 4, 5 and 6, four nozzle assemblies 34 are preferably located in cavities 48 formed in the front pairing 44 of the spray bars 26. Although four nozzle assemblies 34 are shown on each of the spray bars 26 by way of example, it should be understood that two or more nozzle assemblies 34 can be used on each spray bar without departing from the scope of the present invention. These nozzle assemblies 34 are themselves each supplied with a desired liquid (e.g., water) via a plurality of manifolds extending through the front pairing 44. In particular, two of the nozzle assemblies 34 are preferably supplied with liquid via single-nozzle manifolds 36a and 36b, while the remaining two nozzle assemblies 34 are tied to a common manifold 36c. Each of the manifolds 36a, 36b, 36c may be selectively employed by a conventional fluid controller 50 to provide varying degrees of liquid injection to the working fluid of the turbine power plant 10, as will be described in more detail later. In other words, the nozzle assemblies 34 on a spray bar 26 can be independently operated or operated in combination with one another.

As best shown in FIG. 3B, three fluid supply lines 52 are each coupled to the adapter caps 42 about the annular ring assembly 24. More specifically the three fluid supply lines 52 each communicate with a respective different one of the three manifolds 36a, 36b, 36c via the inlets 38. When selectively actuated by the fluid controller 50, one or more of the fluid supply lines 52 carries fluid to the nozzle assemblies 34 depending on whether the liquid injection system 18 is under stage 1, stage 2, stage 3 or stage 4 actuation.

As shown in FIG. 3A, there are preferably eighteen spray bars 26 radially disposed about the annular ring assembly 24. Although eighteen spray bar 26 are shown by way of example, it should be understood that a fewer or greater number of spray bars can be used. As employed heretofore in the art, it has been known to selectively energize only certain spray bars in a staggered fashion such that all of the nozzle assemblies supported by each of the energized spray bars are activated at the same time. Thus, with known systems, the first, fourth seventh, and so on, spray bars are selectively employed, and each of these spray bars cause all of their imbedded nozzle assemblies to inject liquid at the same time. Thus, as mentioned above, a drawback of known systems is that the selective employment of discreet spray bars creates areas of localized higher pressure about the operational axis L.

The present invention seeks to overcome the drawbacks of such known systems by employing the spray bars 26 in a manner which harmonizes the pressure regimen and water dispersion about the operational axis L. In this regard, the liquid injection system 18 is configured to selectively direct liquid through one or more of the manifolds 36a, 36b, 36c of each of the spray bars 26 to energize associated nozzle assemblies 34 as warranted by environmental conditions and/or power demands.

In particular, and as best seen in FIG. 5, the liquid injection system 18 in accordance with the present invention is configured to energize the nozzle assemblies 34 of the spray bars 26 in such a manner that substantially uniform annular zones of water are injected by the selective operation of the manifolds 36a, 36b, 36c. That is, as shown in FIG. 5, it is possible for the fluid controller 50 to have only the stage 1 nozzle assemblies actuated in each of the eighteen spray bars 26 located about the annular ring assembly 24. By actuating only the manifold 36a which controls the stage 1 nozzle assemblies 34 in each of the spray bars 26, it is possible to produce annular zones of water which are substantially uniform in density about the operational axis L.

Still further, when additional power is required, the fluid controller 50 of the liquid injection system 18 is configured to selectively actuate both the manifold 36a as well as the manifold 36b, thus activating both stage 1 and stage 2 nozzle assemblies 34. As shown in FIG. 5, when both the manifolds 36a and 36b are actuated, two sets of nozzle assemblies 34 on each of the spray bars 26 inject liquid into the working fluid of the turbine power plant 10. Doing so obviously increases the size of the annular zones created about the operational axis L, but this zone is still substantially uniform.

It is also possible for the fluid controller 50 to activate the stage 3 nozzle assemblies 34 by simultaneously actuating manifolds 36a, 36b and 36c. While employing the stage 3 nozzle assemblies 34 causes all of the nozzle assemblies 34 in each of the spray bars 26 to be actuated, the stage 3 actuation varies the pressure through the common manifold 36c. Thus, during stage 3 actuation, it is possible to vary the output of the nozzle assemblies 34 by varying the amount of liquid permitted to flow through the common manifold 36c.

Finally, in a stage 4 actuation, all of the nozzle assemblies 34 in each of the spray bars 26 are simultaneously actuated by the fluid controller 50; however the common manifold 36c is operated by the fluid controller at its maximum capacity. Thus, a stage 4 actuation corresponds to maximum liquid injection by the liquid injection system 18 embodying the present invention.

By supplying separate manifolds 36a, 36b and 36c to discreet nozzle assemblies 34 in each of the spray bars 26, the liquid injection system 18 embodying the present invention is capable of actuating discreet, radial sections of each of the spray bars 26—in stark contrast to known systems. Moreover, by selectively actuating only discreet nozzle assemblies 34 on each of the spray bars 26, substantially uniform annular zones of water are created about the operational axis L, and hence, localized pressure distortions about the operational axis L are effectively eliminated.

Figure 7A:
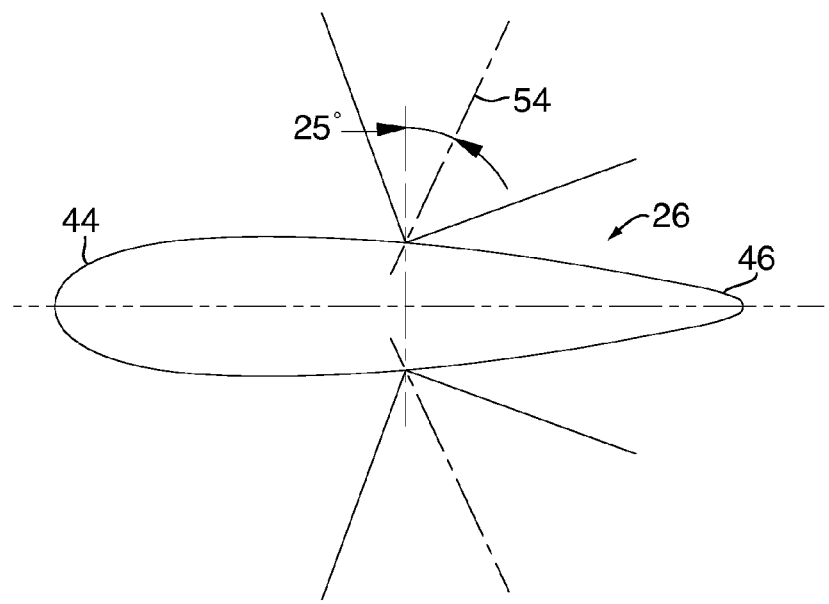
FIG. 7A schematically illustrates a fluid spray direction outwardly from a spray bar in accordance with the present invention.
Figure 7B:
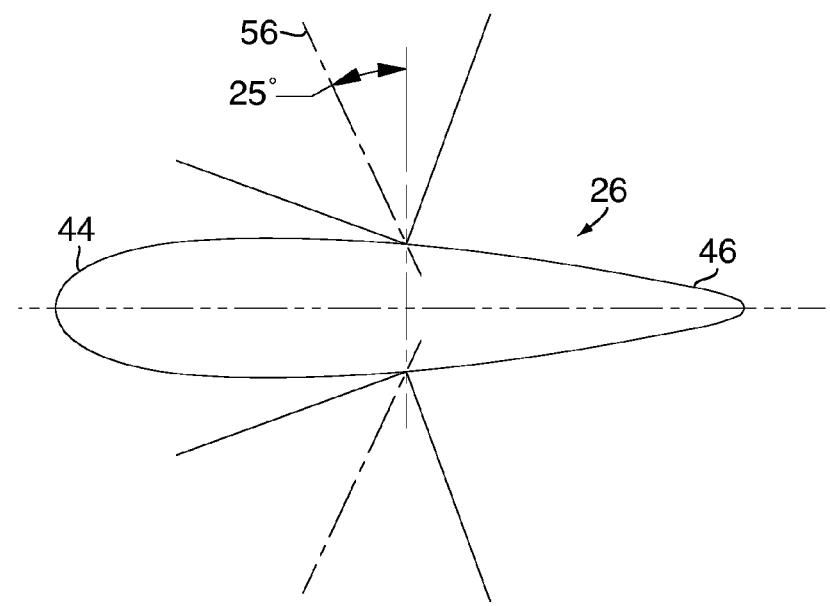
FIG. 7B schematically illustrates another fluid spray direction outwardly from a spray bar.

FIGS. 7A and 7B illustrate by way of example different angular orientations of the nozzle assemblies in relationship to the spray bar. With reference to FIG. 7A, for example, a spray bar with front pairing 44 and rear pairing 46 has nozzle assemblies orientated to spray in direction 54 oriented 25 degrees rearwardly relative a sideward direction. With reference to FIG. 7B, for example, a spray bar with front pairing 44 and rear pairing 46 has nozzle assemblies orientated to spray in direction 56 oriented 25 degrees forwardly relative to a sideward direction. Although FIGS. 7A and 7B show two spray directions by way of example, it should be understood that the nozzle assemblies can be oriented on the spray bars to spray in other forward or rearward directions without departing from the scope of the present invention. Moreover, the spray directions can be angled to be in upward and downward directions (i.e. angled in directions into and out of the page as shown in FIGS. 7A and 7B. For example, the nozzle assemblies can be angled 25 degrees downwardly or 25 degrees upwardly or at any other downward or upward direction.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. A liquid injection system for a turbine power plant comprising:
a hub configured to be coupled to an air intake case of a turbine power plant;
an annular ring assembly spaced radially outwardly from the hub; and
a plurality of spray bars spoked between and circumferentially spaced about the hub and the annular ring, the spray bars each including an elongated body portion having an inner end coupled to the hub and an outer end coupled to the annular ring assembly, the spray bars each having at least two nozzle assemblies spaced from one another along the body portion, and the spray bars each defining at least two liquid supply manifolds each having an inlet at the annular ring assembly and an outlet at an associated nozzle assembly, the at least two liquid supply manifolds each being configured to supply liquid to an associated at least one of the at least two nozzle assemblies,
wherein the at least two liquid supply manifolds defined by each of the spray bars includes first, second and third manifolds, and wherein the at least two nozzle assemblies includes first, second, third and fourth nozzle assemblies, the first manifold communicating with the first nozzle assembly, the second manifold communicating with the second nozzle assembly, and the third manifold communicating with the third and fourth nozzle assemblies.

2. A liquid injection system as defined in claim 1, wherein the nozzle assemblies are oriented to spray in directions rearwardly relative to a sideward direction of the associated spray bars.

3. A liquid injection system as defined in claim 1, wherein the nozzle assemblies are oriented to spray in directions forwardly relative to a sideward direction of the associated spray bars.

4. A liquid injection system as defined in claim 1, wherein the nozzle assemblies are oriented to spray in directions downwardly relative to the associated spray bars.

5. A liquid injection system as defined in claim 1, wherein the nozzle assemblies are oriented to spray in directions upwardly relative to the associated spray bars.

6. A liquid injection system for a turbine power plant comprising:
a hub configured to be coupled to an air intake case of a turbine power plant;

an annular ring assembly spaced radially outwardly from the hub; and a plurality of spray bars spoked between and circumferentially spaced about the hub and the annular ring, the spray bars each including an elongated body portion having an inner end coupled to the hub and an outer end coupled to the annular ring assembly, the spray bars each having at least two nozzle assemblies spaced from one another along the body portion, and the spray bars each defining at least two liquid supply manifolds each having an inlet at the annular ring assembly and an outlet at an associated nozzle assembly, the at least two liquid supply manifolds each being configured to supply liquid to an associated at least one of the at least two nozzle assemblies, wherein the spray bars each define a recess for accommodating the associated nozzle assemblies.

7. A liquid injection system for a turbine power plant comprising:

a hub configured to be coupled to an air intake case of a turbine power plant;

an annular ring assembly spaced radially outwardly from the hub; and a plurality of spray bars spoked between and circumferentially spaced about the hub and the annular ring, the spray bars each including an elongated body portion having an inner end coupled to the hub and an outer end coupled to the annular ring assembly, the spray bars each having at least two nozzle assemblies spaced from one another along the body portion, and the spray bars each defining at least two liquid supply manifolds each having an inlet at the annular ring assembly and an outlet at an associated nozzle assembly, the at least two liquid supply manifolds each being configured to supply liquid to an associated at least one of the at least two nozzle assemblies, further including a plurality of adapter caps each coupled to a different one of the spray bars, the adapter caps each including a plurality of ports each communicating with a different one of the inlets of the liquid supply manifolds.

8. A liquid injection system for a turbine power plant comprising:

a hub configured to be coupled to an air intake case of a turbine power plant;

an annular ring assembly spaced radially outwardly from the hub; and a plurality of spray bars spoked between and circumferentially spaced about the hub and the annular ring, the spray bars each including an elongated body portion having an inner end coupled to the hub and an outer end coupled to the annular ring assembly, the spray bars each having at least two nozzle assemblies spaced from one another along the body portion, and the spray bars each defining at least two liquid supply manifolds each having an inlet at the annular ring assembly and an outlet at an associated nozzle assembly, the at least two liquid supply manifolds each being configured to supply liquid to an associated at least one of the at least two nozzle assemblies, wherein the spray bars each include interlocking front and rear pairing assemblies.

9. A liquid injection system as defined in claim 8, wherein the front pairing assemblies each define a recess for accommodating an associated one of the nozzle assemblies.

* * * * *

UNITED STATES PATENT AND TRADEMARK OFFICE
CERTIFICATE OF CORRECTION

| | | |
|---|---|---|
| PATENT NO. | : 8,291,714 B2 | Page 1 of 1 |
| APPLICATION NO. | : 12/329124 | |
| DATED | : October 23, 2012 | |
| INVENTOR(S) | : Walter K. Omielan et al. | |

It is certified that error appears in the above-identified patent and that said Letters Patent is hereby corrected as shown below:

The U.S. Patent Office made a typographical error on the front page of the patent.

Item 73 in the assignee section please correct the spelling of the word "Endgineering" to --Engineering--.

Signed and Sealed this
First Day of January, 2013

David J. Kappos
*Director of the United States Patent and Trademark Office*